(12) United States Patent
Dsouza

(10) Patent No.: US 11,835,124 B2
(45) Date of Patent: Dec. 5, 2023

(54) AIR COOLING ASSEMBLY

(71) Applicant: Dana Motion Systems Deutschland GmbH, Bad Homburg (DE)

(72) Inventor: Raymond Dsouza, Bad Homburg (DE)

(73) Assignee: DANA MOTION SYSTEMS DEUTSCHLAND GMBH, Bad Homburg (DE)

( * ) Notice: Subject to any disclaimer, the term of this patent is extended or adjusted under 35 U.S.C. 154(b) by 0 days.

(21) Appl. No.: 17/804,538

(22) Filed: May 27, 2022

(65) Prior Publication Data

US 2022/0381333 A1 Dec. 1, 2022

(30) Foreign Application Priority Data

May 31, 2021 (DE) ...................... 10 2021 205 526.5

(51) Int. Cl.
*F16H 57/04* (2010.01)
*F16D 1/108* (2006.01)
*F16H 57/02* (2012.01)

(52) U.S. Cl.
CPC ......... *F16H 57/0416* (2013.01); *F16D 1/108* (2013.01); *F16H 2057/02034* (2013.01)

(58) Field of Classification Search
CPC ............... F16H 57/031; F16H 57/0415; F16H 57/0416; F16H 2057/02034; F16D 1/108
See application file for complete search history.

(56) References Cited

U.S. PATENT DOCUMENTS

| 2,583,751 | A | * | 1/1952 | Schmitter | ........... F16H 57/0493 184/104.1 |
| 7,827,878 | B2 | * | 11/2010 | Langer | .................. F16H 57/025 74/423 |
| 8,555,747 | B2 | * | 10/2013 | Kant | .................... F16H 57/0415 74/606 R |
| 9,429,223 | B2 | * | 8/2016 | Abe | ..................... F16H 57/0415 |
| 10,371,247 | B2 | * | 8/2019 | Chandler | ............. F16H 57/0416 |
| 10,718,353 | B2 | * | 7/2020 | Völker | .................... F04D 17/06 |

FOREIGN PATENT DOCUMENTS

| DE | 4336789 | C1 | * | 5/1995 | ........... A01B 61/025 |
| DE | 102005031197 | A1 | * | 1/2007 | ........... F01D 29/329 |
| EP | 1961993 | A1 | | 8/2008 | |
| FR | 1532899 | A | * | 7/1968 | |
| JP | H05322007 | A | * | 12/1993 | |
| JP | 2001165285 | A | * | 6/2001 | ......... F16H 57/0415 |
| KR | 20150084954 | A | * | 7/2015 | |

* cited by examiner

*Primary Examiner* — Adam D Rogers
(74) *Attorney, Agent, or Firm* — McCoy Russell LLP

(57) ABSTRACT

The present document relates to an air cooling assembly comprising a transmission assembly, a coupling housing mounted on the transmission assembly, a transmission input shaft at least partially disposed within the coupling housing and defining an axial direction, an air fan mounted on the transmission input shaft, and a fan hood at least partially enclosing the coupling housing and at least partially extending over the transmission assembly in the axial direction. The fan hood is configured to guide an air flow created by the air fan for cooling the transmission assembly.

15 Claims, 3 Drawing Sheets

AIR COOLING ASSEMBLY

CROSS-REFERENCE TO RELATED APPLICATION

The present application claims priority to German Patent Application No. 10 2021 205 526.5, entitled "AIR COOLING ASSEMBLY", and filed on May 31, 2021. The entire contents of the above-listed application is hereby incorporated by reference for all purposes.

TECHNICAL FIELD

The present document relates to an air cooling assembly, such as an assembly for cooling a transmission or gear box. Assemblies of the presently proposed type are suited for but not limited to industrial applications such as cranes, conveyors, mixers, stirrers, extruders, or the like.

BACKGROUND AND SUMMARY

As the size and complexity of a mechanical transmission or gearbox increase, its capacity to dissipate heat becomes a limiting factor in many applications. For this reason, many transmissions require an additional cooling system comprising, for example, an oil sump, a water cooled heat exchanger, an electric cooling fan for surface cooling, or an air fan mounted on a transmission shaft.

For example, EP1961993B1 discloses a bevel gear mechanism, especially a bevel spur-gear mechanism having one or more gear mechanism stages, including a gear mechanism housing that surrounds the gear mechanism stages, and a motor cage, which is connected via a spacer flange to the gear mechanism housing, and is connected to an electric motor. The drive side shaft of the bevel gear mechanism stage is supported in a flanged bushing. Spacer flange and drive side end wall of the gear mechanism housing have a common bore. The common bore extends around the flanged bushing of the drive side shaft. The flanged bushing has a cylindrical outer surface that centers the gear mechanism housing, the spacer flange and the flanged bushing. Furthermore, the flanged bushing, the spacer flange and the drive side end wall are interconnected by screws. A fan is disposed in an interior of the motor cage on a bevel pinion shaft. A cylindrical air-conducting hood surrounds the fan. The hood is mounted on the spacer flange via a connection that includes threaded rods. Openings in the outer wall of the motor cage serve for the supply of air and may be used for maintenance work.

However, there continues to be demand for a cooling assembly that provides efficient cooling and that can be produced and maintained at low cost.

An air cooling assembly that combines the advantages described above and other advantages is described herein.

The presently proposed air cooling assembly comprises a transmission assembly, a coupling housing mounted on the transmission assembly, a transmission input shaft at least partially disposed within the coupling housing and defining an axial direction, an air fan mounted on the transmission input shaft and usually disposed within the coupling housing, and a fan hood configured to guide an airflow created by the air fan for cooling the transmission assembly. The fan hood at least partially encloses the coupling housing and at least partially extends over the transmission assembly along the axial direction. In this way, mounting of the fan hood on the coupling housing may be facilitated and the cooling efficiency of the assembly may be enhanced.

The transmission assembly may include a transmission housing. The coupling housing may then be mounted on or connected or attached to the transmission housing, for example via connecting members such as screws, bolts, clamps, fasteners, a threaded connection, or the like. In some embodiments an adapter plate connected to both the transmission housing and the coupling housing may be disposed in between the transmission housing and the coupling housing. Usually, the transmission assembly further includes a plurality of shafts and gears and possibly a plurality of clutching devices providing a plurality of different gear ratios between an input and an output of the transmission.

The fan hood may form an axially extending air duct. The air duct formed by the fan hood may at least partially or completely circumferentially enclose an axially extending portion of the coupling housing. Additionally or alternatively, the air duct formed by the fan hood may at least partially or completely circumferentially enclose an axially extending portion of the transmission assembly. The transmission housing may delimit the air duct formed by the fan hood. Or in other words, the air duct may be formed in between or may be enclosed by the fan hood and the transmission housing.

The transmission input shaft may further define one or more lateral directions perpendicular to the axial direction. An axially extending air gap or a laterally extending air duct may be formed in between the fan hood and a laterally extending portion of the transmission assembly or of the transmission housing. The axially extending air gap or the laterally extending air duct may be configured to guide an airflow created by the air fan along the laterally extending portion of the transmission assembly or of the transmission housing.

An axially extending portion of the fan hood may rest on and/or may be connected to the transmission assembly or the transmission housing, for example an axially extending portion of the fan hood may be connected to the transmission assembly or to the transmission housing via connecting members such as screws, bolts, clamps, fasteners, or the like. In some embodiments a rubber bush may be disposed in between a portion of the fan hood resting on the transmission housing and the transmission housing.

An axially extending portion of the coupling housing may include one or more outlet openings providing fluid communication between the air fan and the air duct formed by the fan hood. For example, the one or more outlet openings may be formed in an axially extending wall portion of the coupling housing. In or along the axial direction, the one or more outlet openings may be at least partially disposed or may at least partially extend in between the air fan and the transmission assembly. The air fan may be configured as an axial fan or as a radial fan, for example.

The coupling housing may include one or more inlet openings. For example, the one or more inlet openings may be formed in an axially extending wall portion of the coupling housing. The one or more inlet openings may be axially spaced apart from the air duct formed by the fan hood. Additionally or alternatively, the one or more inlet openings may be axially spaced apart from the outlet openings. The air fan may be axially disposed in between at least a section or a portion of the one or more inlet openings and at least a section or a portion of the one or more outlet openings. For example, the fan hood may be configured or formed such that on a laterally outer surface of the coupling housing facing away from the rotation axis of the transmission input shaft the fan hood separates or fluidly isolates the inlet openings from the outlet openings, thereby facilitating the build up of a pressure gradient between the inlet openings and the outlet openings.

The fan hood may be mounted or supported on the coupling housing. For example, the fan hood may be mounted on or may be supported on a laterally outer surface of the coupling housing facing away from the rotation axis defined by the transmission input shaft. For instance, the fan hood may be connected to the coupling housing via one or more connecting members such screws, bolts, clamps, fasteners, or the like. Additionally or alternatively, the fan hood may be connected to the coupling housing via a snap fit, a spring lock or a latch. The fan hood may be made in one piece, or the fan hood may have a modular design and may comprise separate pieces. In case the fan hood comprises separate pieces, some or all of the separate pieces of the fan hood may be connected to the coupling housing. Additionally or alternatively, some or all of the separate pieces of the fan hood may be connected to one another.

The proposed cooling assembly may further include a motor assembly. The motor assembly may comprise an electric motor including a rotor and a stator. However, it is understood that in some embodiments the motor assembly may comprise another type of motor such as a hydraulic motor or a combustion engine. The motor assembly may be mounted on the coupling housing, for example via one or more connecting members such as screws, bolts, clamps, fasteners, or the like. In some embodiments the coupling housing and the motor assembly may be configured such that the motor assembly is supported by and connected to the coupling housing only, i. e. there is no need that the motor assembly be further supported on the ground, for example. Such an arrangement renders the proposed assembly may be flexible.

The motor assembly may further include a motor housing. In this case, the motor assembly may be mounted on or connected or attached to the coupling housing via the motor housing, for example. The motor assembly usually comprises a motor output shaft. The motor output shaft and the transmission input shaft may be coaxially aligned. The motor output shaft may be connected to the transmission input shaft via a coupling device. The coupling device may include but is not limited to a sleeve or bushing, or possibly a joint such as a cardan shaft, a constant velocity joint, or the like.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
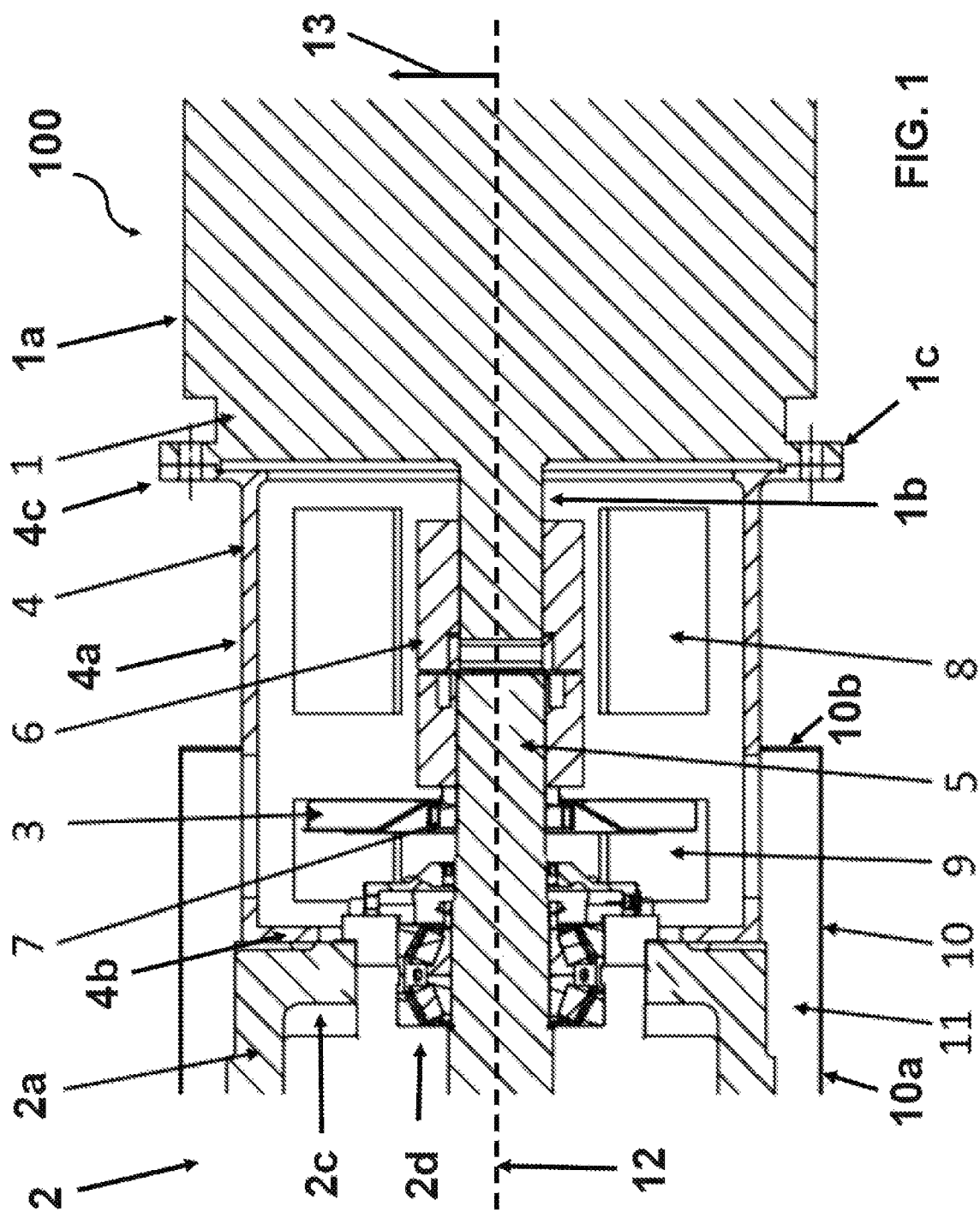
FIG. 1 schematically shows an axial section of an air cooling assembly of the presently proposed type according to a first embodiment.
Figure 2:
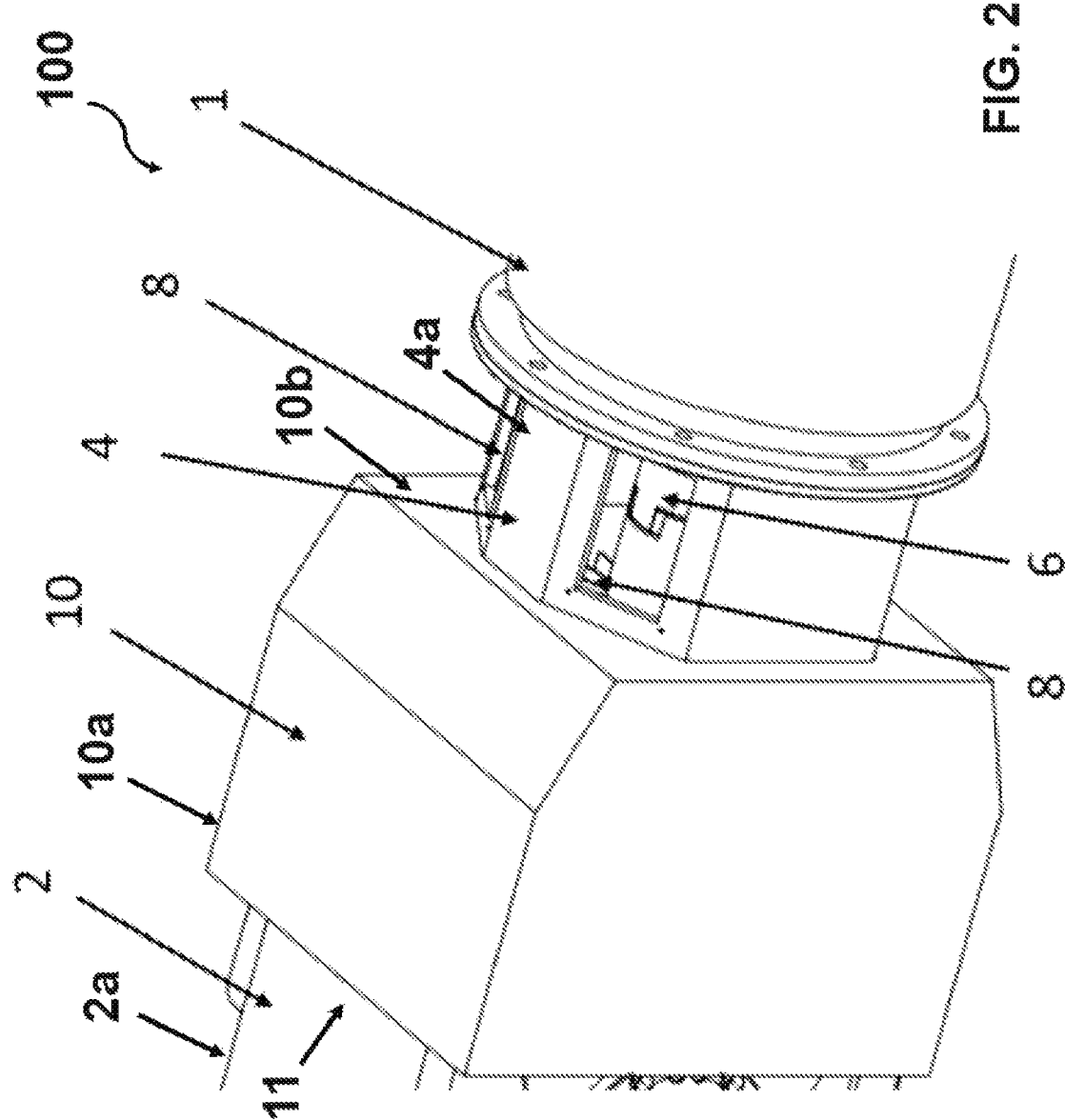
FIG. 2 schematically shows a perspective view of the air cooling assembly of FIG. 1.

FIG. 1 schematically illustrates an axial section of an air cooling assembly 100 of the presently proposed type according to a first embodiment. FIG. 2 schematically depicts a perspective view of the air cooling assembly 100 of FIG. 1. Here and in all of the following the same or analogous features recurring in different figures are designated with the same reference signs. The assembly 100 includes a transmission assembly 2 including a frame or housing 2a, a coupling housing 4, a transmission input shaft 5, an air fan 3 mounted on the transmission input shaft 5, and a fan hood 10 for guiding an airflow created by the air fan 3 towards the transmission assembly 2 for cooling the transmission assembly 2. The transmission shaft 5 is rotationally supported by a set of bearings 2d which are mounted on the transmission housing 2a. The transmission input shaft shaft 5 is partially disposed in or enclosed by the transmission housing 2a, and the transmission input shaft 5 is partially disposed in or enclosed by the coupling housing 4. The air fan 3, too, is disposed within the coupling housing 4.

In the embodiment depicted here, the assembly 100 further includes a motor assembly 1. The motor assembly 1 comprises or is configured as an electric motor. It is understood that in alternative embodiments the motor assembly may comprise or may be configured as a combustion engine, a hydraulic motor, a turbine, or the like. The motor assembly 1 further includes a motor housing 1a and a motor output shaft 1b. The motor output shaft 1b and the transmission input shaft 5 are coaxially aligned with respect to a common rotation axis defining an axial direction 12 and lateral directions 13 perpendicular to the axial direction 12. It is understood that in other embodiments the shafts 1b and 5 may not be coaxially aligned. The plane of projection of FIG. 1 includes the rotation axis. The motor assembly 1 is coupled to the transmission input shaft 5 via the motor output shaft 1b and a coupling device 6. In the embodiment depicted here the coupling device 6 includes one or more sleeve-like members which rotationally lock the motor output shaft 1b and the transmission input shaft 5 to one another. It is understood that in alternative embodiments the coupling device 6 may include a joint such as a cardan joint, a constant velocity joint, or the like.

The coupling housing 4 or a portion thereof may have a polyhedral or cylindrical shape comprising one or more axially extending wall portions 4a. Here, the wall portions 4a extend in parallel or at least partially in parallel to the axial direction 12. It is understood that in alternative embodiments the coupling housing 4 may have other shapes. For example, the wall portions 4a may be step-like or may be inclined or at least partially inclined with respect to the axial direction 12. The coupling housing 4 is connected or attached to the transmission housing 2a, for example via connecting members such as screws, bolts, fasteners, clamps, or the like. In some embodiments, the coupling housing 4 may be connected or attached to the transmission assembly 2 via an adapter plate disposed in between the coupling housing 4 and the transmission assembly 2 such as in between the coupling housing 4 and the transmission housing 2a, for example.

In the embodiment depicted in the figures, the coupling housing 4 comprises a laterally extending first axial end portion 4b facing the transmission assembly 2, and the transmission housing 2a comprises a laterally extending axial end portion 2c facing the coupling housing 4. Here, the laterally extending first axial end portion 4b of the coupling housing 4 is connected or attached to the laterally extending axial end portion 2c of the transmission housing 2a. The transmission housing 2a and the coupling housing 4 may be aligned or essentially aligned with respect to the rotation axis defining the axial direction 12. Further, a maximum lateral extension of the coupling housing 4 may be smaller than a maximum lateral extension of the transmission housing 2a. However, it is understood that in other embodiments the transmission housing 2a and the coupling housing 4 may be arranged differently and may have other spatial extensions.

The motor assembly 1 or, more specifically, the motor housing 1a is mounted on or connected to the coupling housing 4, for example via connecting members such as screws, bolts, fasteners, clamps, or the like. In the embodiment depicted in the figures, the coupling housing 4 comprises a laterally extending second axial end portion 4c facing the motor assembly 1, and the motor housing 1a comprises a laterally extending axial end portion 1c facing the coupling housing 4. The laterally extending axial end portion 1c of the motor housing 1a is connected or attached to the laterally extending second axial end portion 4c of the coupling housing 4. For example, the coupling housing 4, the motor assembly 1 and the connection between the coupling housing 4 and the motor assembly 1 may be configured in such a way that the motor assembly 1 is or can be exclusively mounted on or connected to the coupling housing 4 so that there is no need for the motor assembly 1 to be supported by or to rest on an additional supporting structure such as on the ground. This renders the assembly 100 may be flexible.

The air fan 3 is mounted on the transmission input shaft 5 by means of a fan hub 7. In the embodiment depicted in the figures the air fan 3 is or includes an axial fan configured to create a primary airflow in or along the axial direction 12. However, it is understood that in alternative embodiments the air fan may be or may include a radial fan configured to create a primary airflow in the lateral direction 13 perpendicular to the axial direction 12.

The coupling housing 4 includes a plurality of inlet openings 8 and a plurality of outlet openings 9. More specifically, the inlet openings 8 and the outlet openings 9 are formed in the axially extending wall portions 4a of the coupling housing 4. The inlet openings 8 are axially spaced apart from the outlet openings 9. Along the axial direction 12, the air fan 3 is disposed in between at least a section or a portion of the inlet openings 8 and at least a section or a portion of the outlet openings 9. Or in other words, the inlet openings 8 or at least a portion of the inlet openings 8 are axially disposed in between the air fan 3 and the motor assembly 1, and the outlet openings 9 or at least a portion of the outlet openings 9 are axially disposed in between the air fan 3 and the transmission assembly 2 or the transmission housing 2a. In this way, the air fan 3 may draw in or suction in air into the coupling housing 4 via the inlet openings 8. As the coupling housing 4 is closed off or essentially closed off by the transmission assembly 2 or by the transmission housing 2a and/or by the laterally extending first axial end portion 4b of the coupling housing 4, the increased air pressure created by the air fan 3 within the coupling housing 4 and in between the air fan 3 and the transmission assembly 2 creates a secondary airflow in the lateral directions 13 and away from the rotation axis defining the axial direction 12. In this way, the air fan 3 pushes air out of the coupling housing 4 via the outlet openings 9 for cooling the transmission assembly 2 and/or the transmission housing 2a.

The fan hood 10 directs the airflow created by the air fan 3 and exiting the coupling housing 4 via the outlet openings 9 toward the transmission assembly 2 for cooling the transmission assembly 2. The fan hood 10 is mounted or supported on the coupling housing 4. More specifically, the fan hood 10 is mounted on a laterally outer side of the axially extending portion 4a of the coupling housing 4. For example, the fan hood 10 may be connected to the coupling housing 4 or to the laterally outer side of the axially extending portion 4a of the coupling housing 4 via connecting members such as screws, bolts, clamps, fasteners, or the like. Additionally or alternatively, the fan hood 10 may be connected to the coupling housing 4 or to the laterally outer side of the axially extending portion 4a of the coupling housing 4 via a snap fit, a spring lock or a latch. The fan hood 10 may be made in one piece or may comprise separate pieces.

In the assembly 100 depicted in FIGS. 1 and 2 the fan hood 10 completely circumferentially encloses an axially extending portion of the coupling housing 4 and an axially extending portion of the transmission assembly 2. More specifically, the fan hood 10 forms a circumferentially and axially extending air duct 11. The air duct 11 is formed in between the fan hood 10 and a laterally outer side of the coupling housing 4 and in between the fan hood 10 and the transmission housing 2a. The air fan 3 is in fluid communication with the air duct 11 formed by the fan hood 10 via the outlet openings 9 of the coupling housing 4. In this manner, the air duct 11 guides the airflow created by the air fan 3 along an outer surface of the transmission housing 2a, thereby enhancing the dissipation of heat generated by the transmission assembly via the transmission housing 2a.

The fan hood 10 comprises an axially extending portion 10a and a laterally extending portion 10b. The portion 10a may rest on and/or may be connected to the transmission housing 2a, for example. The laterally extending portion 10b of the fan hood 10 circumferentially encloses the laterally outer side of the axially extending wall portion 4a of the coupling housing 4. The laterally extending portion 10b of the fan hood 10 is axially disposed in between the inlet openings 8 and the outlet openings 9 of the coupling housing 4. Or in other words, the inlet openings 8 are axially spaced apart from the air duct 11. In some embodiments a sealing member such as a sealing ring may be disposed in between the laterally extending portion 10b of the fan hood 10 and the laterally outer side of the coupling housing 4 in order to seal off the air duct 11 formed by the fan hood 10. Alternatively, the laterally extending portion 10b of the fan hood 10 may be welded or brazed to the coupling housing 4 or to the axially extending wall portion 4a of the coupling housing 4. In this way, the fan hood 10 may seal off the inlet openings 8 from the outlet openings 9 on the laterally outer side of the coupling housing 4 and facilitate the build up of a pressure gradient between the inlet openings 8 and the outlet openings 9. This can be clearly seen in the perspective view of FIG. 2 where only the inlet openings 8 or some of the inlet openings 8 are visible whereas the outlet openings 9 are enclosed and concealed from view by the fan hood 10. In this way, the design of the fan hood 10 facilitates or enhances the creation of a high density airflow for cooling the transmission assembly 2. It is understood that in alternative embodiments the fan hood 10 may be shaped to only partially circumferentially enclose the coupling housing 4 and/or the transmission assembly 2, for example when the coupling housing 4 and/or the transmission assembly 2 rest on a supporting structure or on the ground.

Figure 3:
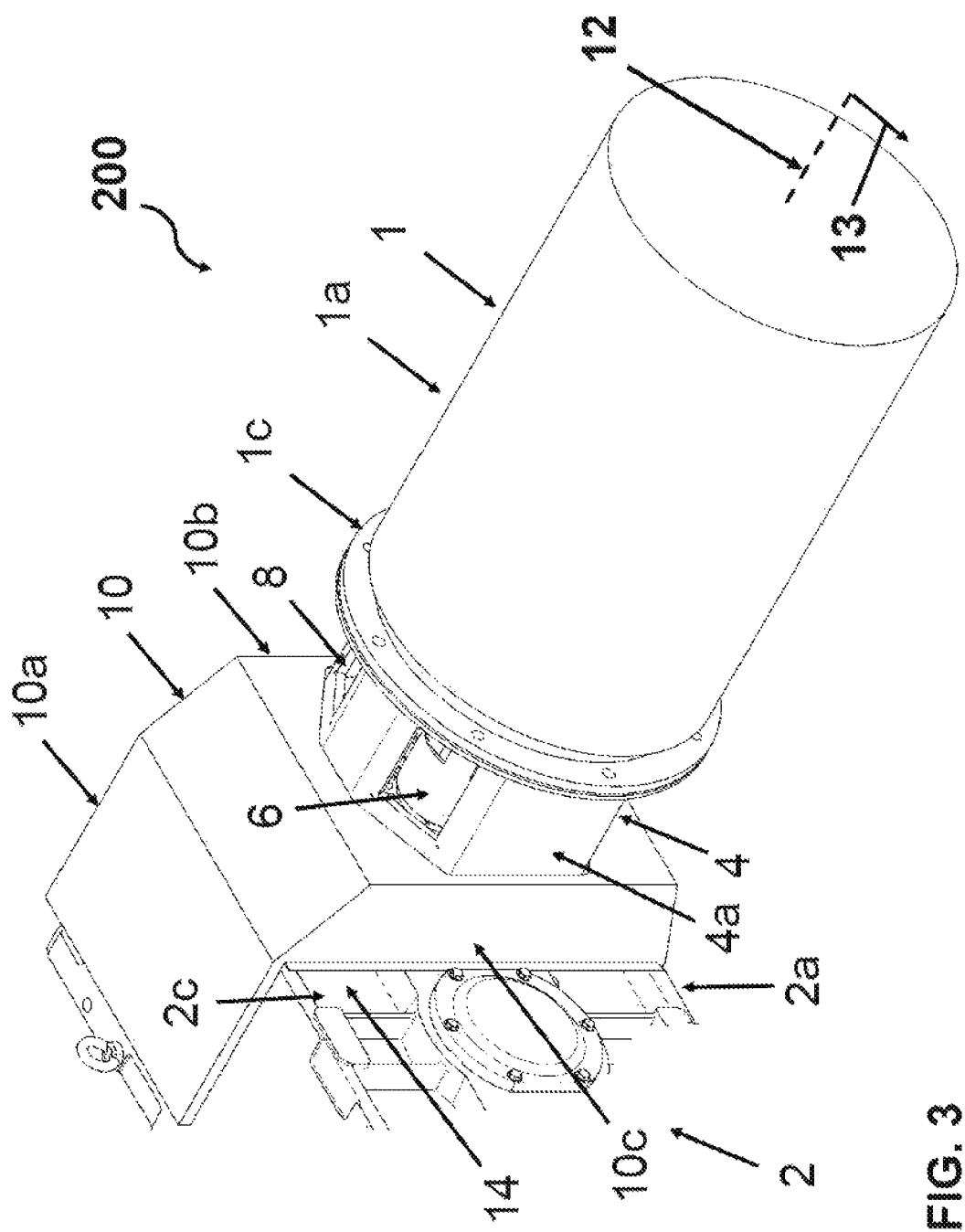
FIG. 3 schematically shows a perspective view of an air cooling assembly of the presently proposed type according to a second embodiment.

FIG. 3 schematically shows a perspective view of an air cooling assembly 200 of the presently proposed type according to a second embodiment. For the sake of brevity, in the following only the differences between the cooling assembly 200 of FIG. 3 and the cooling assembly 100 of FIGS. 1 and 2 are described in detail. Those features of the cooling assembly 200 of FIG. 3 not explicitly mentioned and described here may be realized in the same manner as in the cooling assembly 100 of FIGS. 1 and 2.

Like the air cooling assembly 100 of FIGS. 1 and 2, the air cooling assembly 200 of FIG. 3 comprises a transmission assembly 2 including a transmission housing 2a, a coupling housing 4 mounted on or connected to the transmission assembly 2, a transmission input shaft at least partially disposed within the coupling housing 4 and defining an axial direction 12, an air fan mounted on the transmission input shaft, and a fan hood 10. In FIG. 3 the transmission input shaft and the air fan are hidden from view by the fan hood 10. The fan hood 10 encloses an axially extending portion of the coupling housing, and an axially extending portion 10a of the fan hood 10 extends over the transmission assembly 2 along the axial direction 12. The assembly 200 further includes a motor assembly 1 including a motor housing 1a connected to the coupling housing 4. Again, the motor assembly 1 may include an electric motor, a combustion engine, a hydraulic motor, a turbine, or the like. In FIG. 3 a coupling device 6 rotationally locking the transmission input shaft to a motor output shaft is partially visible through one of a plurality of air inlet openings 8 in an axially extending wall portion 4a of the coupling housing 4.

In the assembly 200 of FIG. 3 an axially extending portion 10a of the fan hood 10 rests on and is connected to an axially extending portion of the transmission housing 2a, for example via connecting members such as screws, bolts, clamps, fasteners, or the like. Here, the portion 10a of the fan hood 10 is connected to a top face of the transmission housing 2a. The fan hood 10 may include a further portion axially extending over and connected to a bottom face of the transmission housing 2a.

The assembly 200 of FIG. 3 differs from the assembly 100 of FIGS. 1 and 2 in that in the assembly 200 of FIG. 3 another axially extending portion 10c of the fan hood 10 does not extend all the way to a laterally extending axial end portion 2c of the transmission housing 2a facing the air fan and the motor assembly 1. In the embodiment depicted in FIG. 3 the portion 10c is arranged perpendicular or essentially perpendicular with respect to the portion 10a connected to the top face of the transmission housing 2a. Further, the axially extending portion 10c is arranged perpendicular or essentially perpendicular with respect to the laterally extending axial end portion 2c of the transmission housing 2a. An axially extending air gap 14 is formed in between the axially extending portion 10c of the fan hood 10 and the laterally extending axial end portion 2c of the transmission housing 2a. In the embodiment illustrated in FIG. 3 the transmission assembly 2 or the transmission housing 2a axially closes off an air duct formed by the fan hood 10. Consequently, an airflow created by the air fan may pass through the air gap 14 in a lateral direction 13 perpendicular to the axial direction 12. The airflow exiting the fan hood 10 through the air gap 14 flows or streams along or over the laterally extending axial end portion 2c of the transmission housing 2a, thereby enhancing the dissipation of heat from the transmission assembly 2 via the portion 2c of the transmission housing 2a.

FIGS. 1-3 are shown approximately to scale. FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An air cooling assembly, comprising:
a transmission assembly,
a coupling housing mounted on the transmission assembly,
a transmission input shaft at least partially disposed within the coupling housing and defining an axial direction,
an air fan mounted on the transmission input shaft,
a fan hood at least partially enclosing the coupling housing and at least partially extending over the transmission assembly along the axial direction, the fan hood configured to guide an air flow created by the air fan for cooling the transmission assembly, and a motor assembly mounted on the coupling housing, wherein the motor assembly includes a motor output shaft connected to the transmission input shaft via a coupling device.

2. The air cooling assembly of claim 1, wherein the fan hood forms an axially extending air duct circumferentially enclosing or at least partially circumferentially enclosing an axially extending portion of the coupling housing.

3. The cooling assembly of claim 2, wherein the air duct formed by the fan hood is delimited by a transmission housing.

4. The air cooling assembly of claim 2, wherein the axially extending air duct formed by the fan hood circumferentially encloses or at least partially circumferentially encloses an axially extending portion of the transmission assembly.

5. The air cooling assembly of claim 2, wherein the transmission input shaft further defines a lateral direction perpendicular to the axial direction, wherein an axially extending air gap is formed in between the fan hood and a laterally extending portion of the transmission assembly, the axially extending air gap configured to guide an airflow created by the air fan along the laterally extending portion of the transmission assembly.

6. The air cooling assembly of claim 2, wherein an axially extending portion of the coupling housing includes one or more outlet openings providing fluid communication between the air fan and the air duct formed by the fan hood.

7. The air cooling assembly of claim 6, wherein the one or more outlet openings are at least partially disposed or extend at least partially in between the air fan and the transmission assembly along the axial direction.

8. The air cooling assembly of claim 1, wherein an axially extending portion of the fan hood rests on and/or is connected to the transmission assembly.

9. The air cooling assembly of claim 1, wherein the coupling housing includes one or more inlet openings.

10. The air cooling assembly of claim 9, wherein the one or more inlet openings are axially spaced apart from an air duct formed by the fan hood.

11. The air cooling assembly of claim 9, wherein the one or more inlet openings are axially spaced apart from one or more outlet openings.

12. The air cooling assembly of claim 11, wherein the air fan is axially disposed in between at least a section of the one or more inlet openings and at least a section of the one or more outlet openings.

13. The air cooling assembly of claim 1, wherein the fan hood is mounted on or supported on the coupling housing.

14. The air cooling assembly of claim 13, wherein the transmission input shaft further defines a lateral direction perpendicular to the axial direction, wherein the fan hood is mounted on or supported on a laterally outer surface of the coupling housing.

15. The air cooling assembly of claim 1, wherein the transmission assembly includes a transmission housing, wherein the coupling housing is mounted on the transmission housing.

* * * * *